US010887350B2

(12) United States Patent
Kulkarni et al.

(10) Patent No.: US 10,887,350 B2
(45) Date of Patent: Jan. 5, 2021

(54) METHOD AND SYSTEM FOR APPLYING COMPLIANCE POLICIES ON PRIVATE AND PUBLIC CLOUD

(71) Applicant: NICIRA, INC., Palo Alto, CA (US)

(72) Inventors: Vaibhav Kulkarni, Pune (IN); Aditya Gokhale, Pune (IN)

(73) Assignee: Nicira, Inc., Palo Alto, CA (US)

(*) Notice: Subject to any disclaimer, the term of this patent is extended or adjusted under 35 U.S.C. 154(b) by 267 days.

(21) Appl. No.: 15/948,198

(22) Filed: Apr. 9, 2018

(65) Prior Publication Data

US 2019/0312909 A1     Oct. 10, 2019

(51) Int. Cl.
*H04L 29/06* (2006.01)
*G06F 9/455* (2018.01)

(52) U.S. Cl.
CPC .......... *H04L 63/20* (2013.01); *G06F 9/45558* (2013.01); *H04L 63/0272* (2013.01); *G06F 2009/45595* (2013.01)

(58) Field of Classification Search
CPC . H04L 63/20; H04L 63/0272; G06F 9/45558; G06F 2009/45595
See application file for complete search history.

(56) References Cited

U.S. PATENT DOCUMENTS

| 9,104,672 | B2 * | 8/2015 | Beaty | H04L 43/0817 |
| 10,148,493 | B1 * | 12/2018 | Ennis, Jr. | H04L 41/0803 |
| 2012/0222084 | A1 * | 8/2012 | Beaty | H04L 43/0817 726/1 |
| 2015/0381567 | A1 * | 12/2015 | Johnson | G06F 21/105 726/12 |
| 2016/0234161 | A1 * | 8/2016 | Banerjee | H04L 67/10 |
| 2017/0099188 | A1 * | 4/2017 | Chang | H04L 12/4633 |
| 2017/0104755 | A1 * | 4/2017 | Arregoces | H04L 63/102 |
| 2017/0302535 | A1 * | 10/2017 | Lee | H04L 63/0272 |
| 2017/0351536 | A1 * | 12/2017 | Kamalakantha | G06F 9/45558 |
| 2018/0234459 | A1 * | 8/2018 | Kung | H04L 63/20 |

* cited by examiner

*Primary Examiner* — Ali S Abyaneh
*Assistant Examiner* — Zoha Piyadehghibi Tafaghodi (57) ABSTRACT

Syncing compliance policies on a private cloud network and a public cloud network is disclosed. The technology accesses a hybrid cloud environment including: at least one private cloud network and at least one public cloud network. A private policy gateway appliance is coupled with the private cloud network and a public policy gateway appliance, in communication with the private policy gateway appliance, is coupled with the public cloud network. One or more policy rules for the hybrid cloud environment are provided to the private policy gateway appliance which then disseminates the one or more policy rules to the public policy gateway appliance, such that the one or more policy rules are synced for the at least one private cloud network and the at least one public cloud network.

20 Claims, 5 Drawing Sheets

ACCESS A HYBRID CLOUD ENVIRONMENT, THE HYBRID CLOUD ENVIRONMENT COMPRISING: AT LEAST ONE PRIVATE CLOUD NETWORK HAVING A FIRST PHYSICAL COMPUTING SYSTEM, THE FIRST PHYSICAL COMPUTING SYSTEM HOSTING A FIRST SET OF MULTIPLE VIRTUAL MACHINES (VMs); AND AT LEAST ONE PUBLIC CLOUD NETWORK HAVING A SECOND PHYSICAL COMPUTING SYSTEM, THE SECOND PHYSICAL COMPUTING SYSTEM HOSTING A SECOND SET OF MULTIPLE VMs.
510

COUPLE A PRIVATE POLICY GATEWAY APPLIANCE WITH THE AT LEAST ONE PRIVATE CLOUD NETWORK.
515

COUPLE A PUBLIC POLICY GATEWAY APPLIANCE WITH THE AT LEAST ONE PUBLIC CLOUD NETWORK, THE PUBLIC POLICY GATEWAY APPLIANCE IN COMMUNICATION WITH THE PRIVATE POLICY GATEWAY APPLIANCE;
520

PROVIDE ONE OR MORE POLICY RULES FOR THE HYBRID CLOUD ENVIRONMENT, THE ONE OR MORE POLICY RULES PROVIDED TO THE PRIVATE POLICY GATEWAY APPLIANCE.
525

DISSEMINATE, VIA THE PRIVATE POLICY GATEWAY APPLIANCE, THE ONE OR MORE POLICY RULES TO THE PUBLIC POLICY GATEWAY APPLIANCE, SUCH THAT THE ONE OR MORE POLICY RULES ARE SYNCED FOR THE AT LEAST ONE PRIVATE CLOUD NETWORK AND THE AT LEAST ONE PUBLIC CLOUD NETWORK.
530

*FIG. 5*

METHOD AND SYSTEM FOR APPLYING COMPLIANCE POLICIES ON PRIVATE AND PUBLIC CLOUD

BACKGROUND

Virtual-machine technology essentially abstracts the hardware resources and interfaces of a computing system on behalf of one or multiple virtual machines, each comprising one or more application programs and an operating system. The recent emergence of cloud computing services can provide abstract interfaces to enormous collections of geographically dispersed data centers, allowing computational service providers to develop and deploy complex Internet-based services that execute on tens or hundreds of physical servers through abstract cloud-computing interfaces.

Often the virtual machines can be found in private cloud environments and public cloud environments. When the virtual environment includes both public and private cloud environments, it is often referred to as a hybrid cloud environment.

However, managing the policies for the different cloud networks in a hybrid cloud environment can be difficult as policies, rules, language, and the like are often different between public and private clouds. As such, updating and enforcing the policies, rules, etc. requires a search of each cloud environment which can be expensive, inconvenient, and time consuming.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless noted, the drawings herein should be understood as not being drawn to scale. Herein, like items are labeled with like item numbers.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included in the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits in a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "connecting," "displaying," "receiving," "providing," "determining," "generating," "establishing," "managing," "extending," "creating," "migrating," "effectuating," or the like, refer to the actions and processes of an electronic computing device (e.g., ClientMachine) or system such as: a host processor, a processor, a memory, a virtual storage area network (VSAN), a virtualization management server or a virtual machine (VM), among others, of a virtualization infrastructure or a computing system of a distributed computing system, or the like, or a combination thereof. It should be appreciated that the virtualization infrastructure may be on-premises (e.g., local) or off-premises (e.g., remote or cloud-based), or a combination thereof. The electronic device manipulates and transforms data represented as physical (electronic and/or magnetic) quantities in the electronic device's registers and memories into other data similarly represented as physical quantities in the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the Figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium having computer readable program code stored thereon may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided in dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example computing system environment, upon which embodiments of the present invention may be implemented. An example cloud-based computing environment, upon which embodiments of the present invention may be implemented, is then discussed. An example of a system and a method for applying compliance policies on private and public cloud network are then described.

The present technology provides a solution to a problem that presently exists in hybrid cloud environments. E.g., environments that include both public cloud networks and private (or enterprise) cloud networks. For example, in the hybrid cloud environment the rules in the private cloud networks are not always the same as the public cloud networks. Moreover, the ability to enforce the rules is not always possible as a private cloud network may have a different architecture than a public cloud network.

Importantly, the embodiments of the present invention, as will be described below, provide an approach for applying compliance policies on private and public clouds in a hybrid cloud environment which differs significantly from the conventional processes used in hybrid cloud environment communications. In conventional approaches, each of the private cloud and the public clouds in the hybrid cloud environment can operate with different rules and different enforcement of the different rules. Such conventional approaches are tedious, time-consuming, and error prone as the rules between the two networks can be different, competing, run afoul of one another, and the like.

Instead, the present embodiments, as will be described and explained below in detail, provide a previously unknown procedure for applying compliance policies on private and public cloud. With evolving technology, aiming at increasing cloud computing security in the hybrid cloud environment, it makes sense for a single set of rules or policies to be followed by all networks within the hybrid cloud environment regardless of whether they are public or private.

For such applications, embodiments described herein provide transparent enforcement of policies across any or all of the different clouds in the hybrid cloud environment. For example, one embodiment solves policy enforcement problems across the public cloud networks and the private cloud networks in the hybrid cloud environment by replicating the corporate policies, e.g., by deploying the public policy gateway appliance in the public cloud network. In addition, all the traffic in the public cloud network will be diverted through the public policy gateway appliance for compliance. Further, the public policy gateway appliance on the public cloud network will be synced with the private policy gateway appliance on the private cloud network to ensure that only the latest policies are being enforced across the hybrid cloud environment.

As will be described in detail, the various embodiments of the present invention do not merely implement conventional processes on a computer. Instead, the various embodiments of the present invention, in part, provide a previously unknown procedure for applying compliance policies on private and public clouds that form a hybrid cloud environment. Hence, embodiments of the present invention provide a novel process for applying compliance policies on private and public clouds that form a hybrid cloud environment which is necessarily rooted in computer technology to overcome a problem specifically arising in the realm of hybrid cloud environments.

Example Computing System Environment

Figure 1:
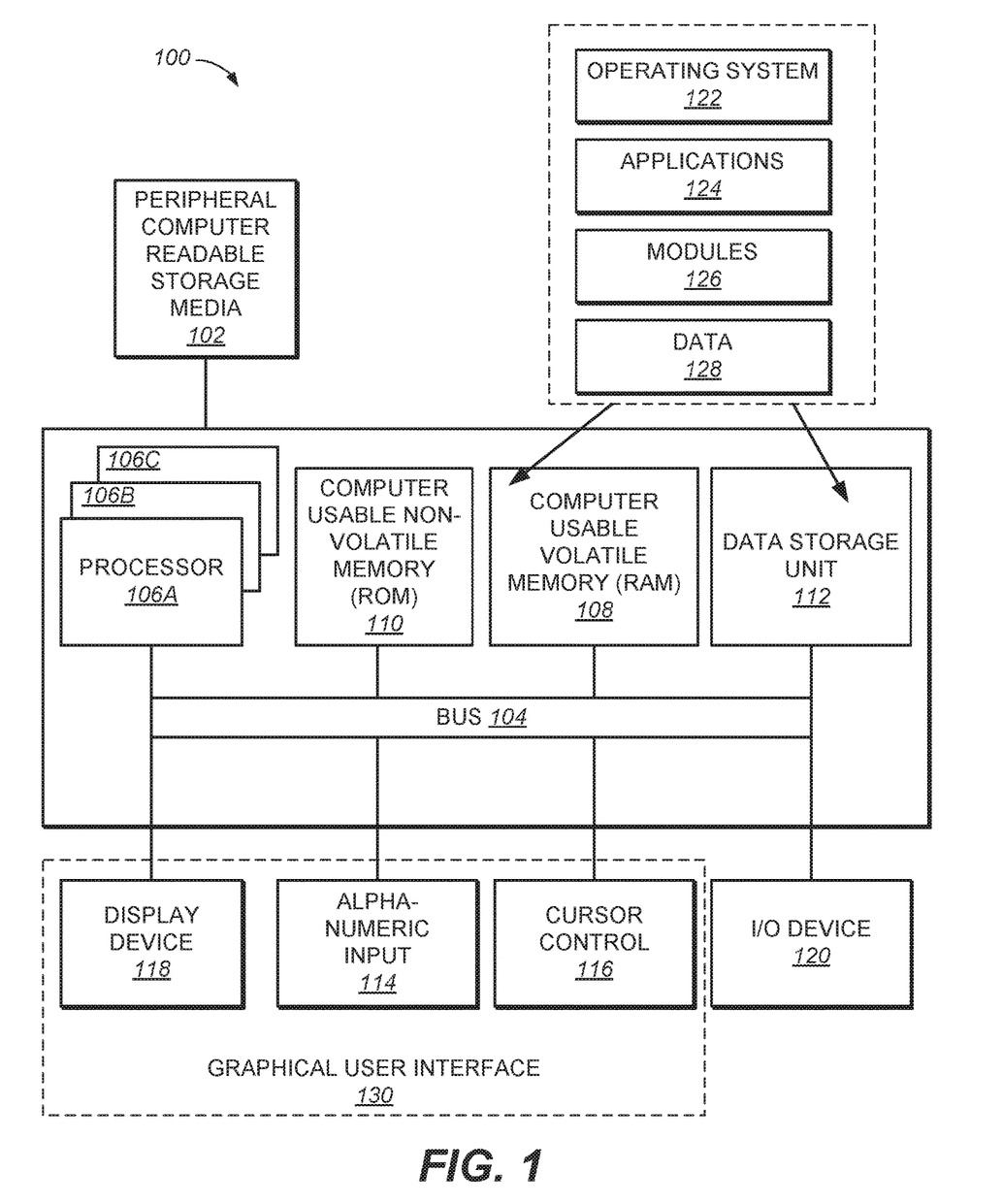
FIG. 1 illustrates a block diagram of a computing system upon which embodiments of the present invention can be implemented.

With reference now to FIG. 1, all or portions of some embodiments described herein are composed of computer-readable and computer-executable instructions that reside, for example, in computer-usable/computer-readable storage media of a computing system. That is, FIG. 1 illustrates one example of a type of computer (computing system 100) that can be used in accordance with or to implement various embodiments which are discussed herein.

It is appreciated that computing system 100 of FIG. 1 is only an example and that embodiments as described herein can operate on or in a number of different computing systems including, but not limited to, general purpose networked computing systems, embedded computing systems, routers, switches, server devices, client devices, various intermediate devices/nodes, stand-alone computing systems, media centers, handheld computing systems, multi-media devices, virtual machines, virtualization management servers, and the like. Computing system 100 of FIG. 1 is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

System 100 of FIG. 1 includes an address/data bus 104 for communicating information, and a processor 106A coupled with bus 104 for processing information and instructions. As depicted in FIG. 1, system 100 is also well suited to a multi-processor environment in which a plurality of processors 106A, 1066, and 106C are present. Conversely, system 100 is also well suited to having a single processor such as, for example, processor 106A. Processors 106A, 1066, and 106C may be any of various types of microprocessors. System 100 also includes data storage features such as a computer usable volatile memory 108, e.g., random access memory (RAM), coupled with bus 104 for storing information and instructions for processors 106A, 106B, and 106C.

System 100 also includes computer usable non-volatile memory 110, e.g., read only memory (ROM), coupled with bus 104 for storing static information and instructions for processors 106A, 106B, and 106C. Also present in system 100 is a data storage unit 112 (e.g., a magnetic or optical disc and disc drive) coupled with bus 104 for storing information and instructions. System 100 also includes an alphanumeric input device 114 including alphanumeric and function keys coupled with bus 104 for communicating information and command selections to processor 106A or processors 106A, 106B, and 106C. System 100 also includes an cursor control device 116 coupled with bus 104 for communicating user input information and command selections to processor 106A or processors 106A, 106B, and 106C. In one embodiment, system 100 also includes a display device 118 coupled with bus 104 for displaying information.

Referring still to FIG. 1, display device 118 of FIG. 1 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement.

Alternatively, it will be appreciated that a cursor can be directed and/or activated via input from alphanumeric input device 114 using special keys and key sequence commands. System 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a UI 130 under the direction of a processor (e.g., processor 106A or processors 106A, 106B, and 106C). UI 130 allows user to interact with system 100 through graphical representations presented on display device 118 by interacting with alphanumeric input device 114 and/or cursor control device 116.

System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations in RAM 108, computer-readable storage media in data storage unit 112, peripheral tangible computer-readable storage media 102, and/or other tangible computer-readable storage media.

The architecture shown in FIG. 1 can be partially or fully virtualized. For example, computing system 100 may be one or possibly many VMs executing on physical hardware and managed by a hypervisor, virtual machine monitor, or similar technology.

Furthermore, in some embodiments, some or all of the components of computing system 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like.

Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

Example Computing Environment

Figure 2:
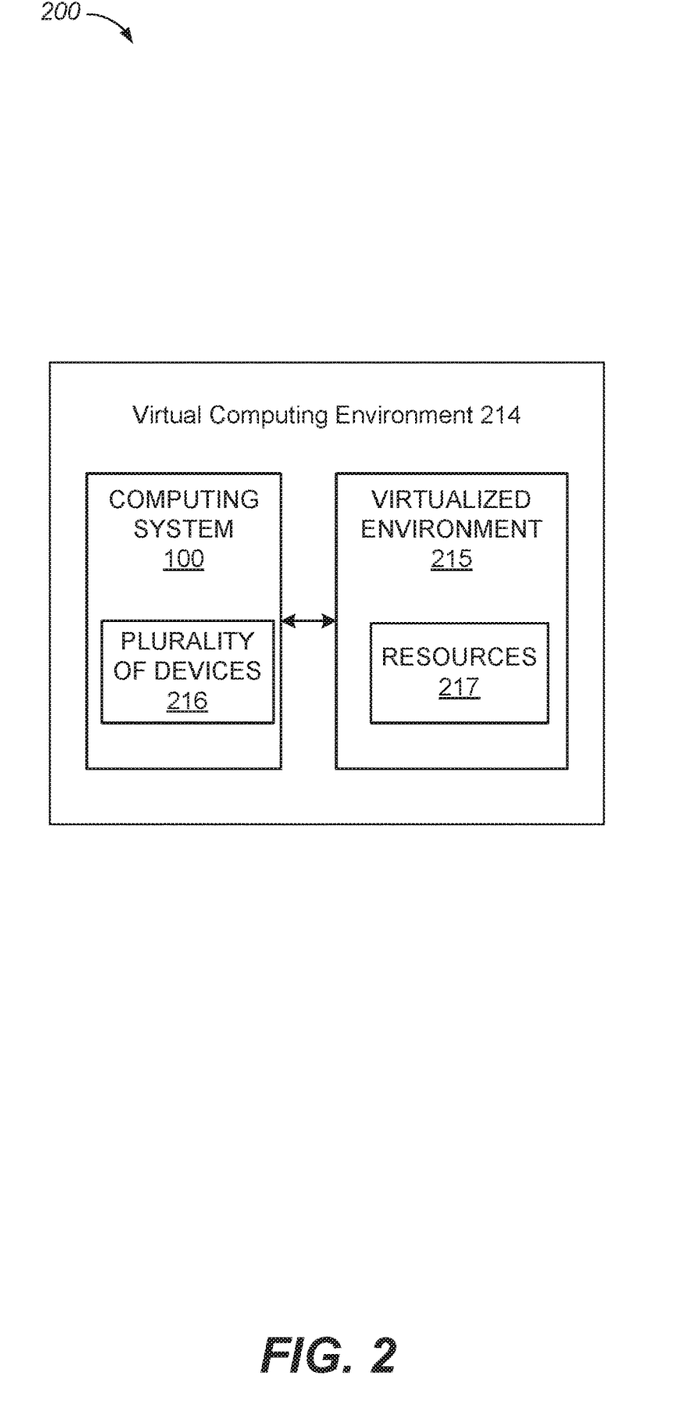
FIG. 2 illustrates a block diagram of a cloud-based computing environment upon which embodiments described herein may be implemented.

FIG. 2 illustrates an example virtual computing environment (VCE 214) upon which embodiments described herein may be implemented. In the cloud-computing paradigm, computing cycles and data-storage facilities are provided to organizations and individuals by cloud-computing providers. In addition, larger organizations may elect to establish private cloud network-computing facilities in addition to, or instead of subscribing to computing services provided by public cloud network-computing service providers.

In one embodiment, VCE 214 (or virtualization infrastructure) includes computing system 100 and virtualized environment 215, according to various embodiments. In general, computing system 100 and virtualized environment 215 are communicatively coupled over a network such that computing system 100 may access functionality of virtualized environment 215.

In one embodiment, computing system 100 may be a system (e.g., enterprise system) or network that includes a combination of computer hardware and software. The corporation or enterprise utilizes the combination of hardware and software to organize and run its operations. To do this, computing system 100 uses resources 217 because computing system 100 typically does not have dedicated resources that can be given to the virtualized environment 215. For example, an enterprise system (of the computing system 100) may provide various computing resources for various needs such as, but not limited to information technology (IT), security, email, etc.

In various embodiments, computing system 100 includes a plurality of devices 216. The devices are any number of physical and/or virtual machines. For example, in one embodiment, computing system 100 is a corporate computing environment that includes tens of thousands of physical and/or virtual machines. It is understood that a virtual machine is implemented in virtualized environment 215 that includes one or some combination of physical computing machines. Virtualized environment 215 provides resources 217, such as storage, memory, servers, CPUs, network switches, etc., that are the underlying hardware infrastructure for VCE 214.

The physical and/or virtual machines of the computing system 100 may include a variety of operating systems and applications (e.g., operating system, word processing, etc.). The physical and/or virtual machines may have the same installed applications or may have different installed applications or software. The installed software may be one or more software applications from one or more vendors.

Each virtual machine may include a guest operating system and a guest file system. Moreover, the virtual machines may be logically grouped. That is, a subset of virtual machines may be grouped together in a container (e.g., VMware apt). For example, three different virtual machines may be implemented for a particular workload. As such, the three different virtual machines are logically grouped together to facilitate in supporting the workload. The virtual machines in the logical group may execute instructions alone and/or in combination (e.g., distributed) with one another.

Also, the container of virtual machines and/or individual virtual machines may be controlled by a virtual management system. The virtualization infrastructure may also include a plurality of virtual datacenters. In general, a virtual datacenter is an abstract pool of resources (e.g., memory, CPU, storage). It is understood that a virtual data center is implemented on one or some combination of physical machines.

In various embodiments, computing system 100 may be a cloud environment, built upon a virtualized environment 215. Computing system 100 may be located in an Internet connected datacenter or a private cloud network computing center coupled with one or more public and/or private networks. Computing system 100, in one embodiment, typically couples with a virtual or physical entity in a computing environment through a network connection which may be a public network connection, private network connection, or some combination thereof.

As will be described in further detail herein, the virtual machines are hosted by a host computing system. A host includes virtualization software that is installed on top of the hardware platform and supports a virtual machine execution space within which one or more virtual machines may be concurrently instantiated and executed.

In some embodiments, the virtualization software may be a hypervisor (e.g., a VMware ESXTM hypervisor, a VMware Exit hypervisor, etc.) For example, if hypervisor is a VMware ESXTM hypervisor, then virtual functionality of the host is considered a VMware ESXTM server.

Additionally, a hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems.

During use, the virtual machines perform various workloads. For example, the virtual machines perform the workloads based on executing various applications. The virtual machines can perform various workloads separately and/or in combination with one another.

Figure 3:
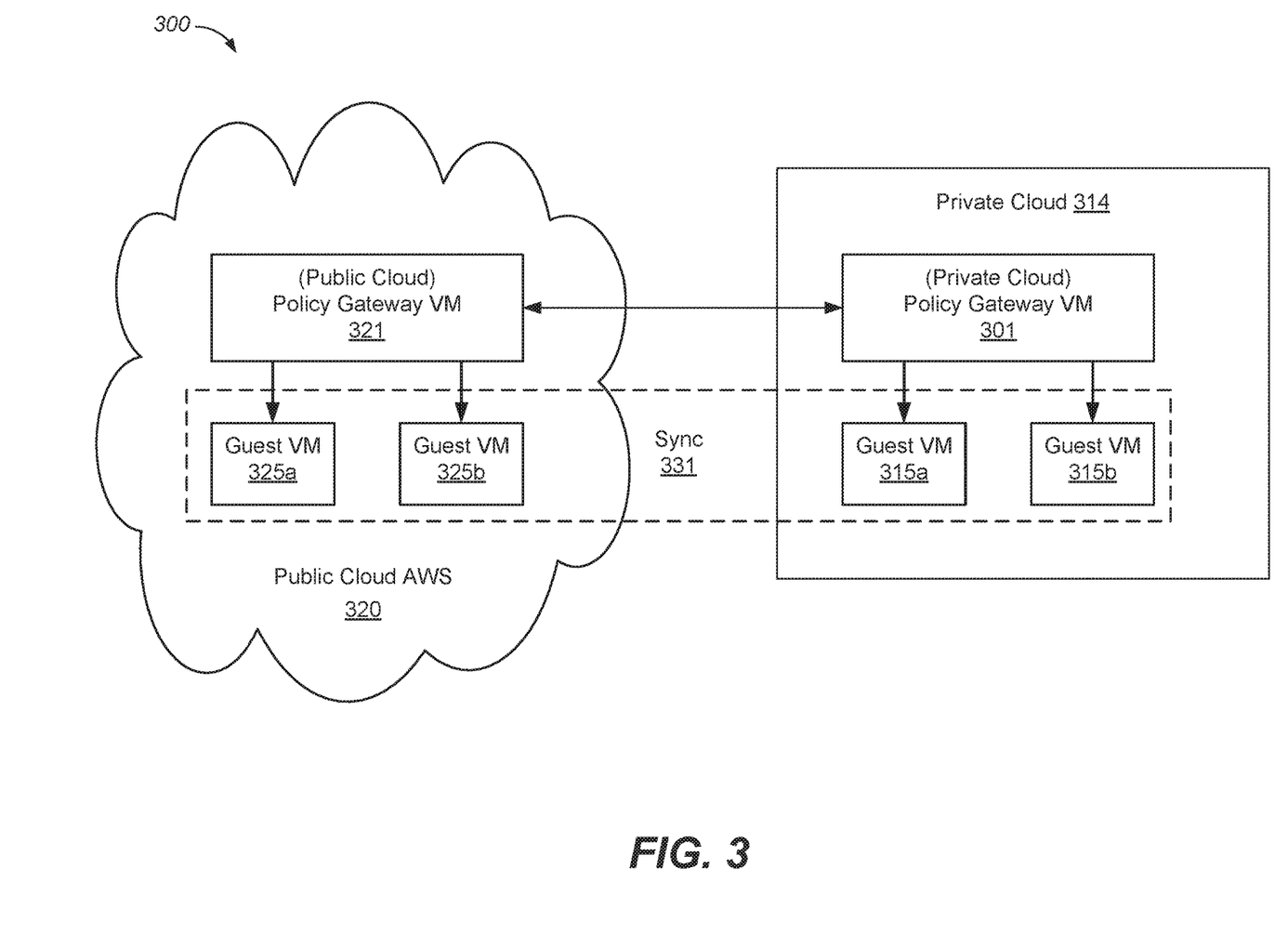
FIG. 3 illustrates a block diagram of a hybrid cloud environment including a private cloud network and a public cloud network upon which embodiments described herein may be implemented.

With reference now to FIG. 3, a block diagram of a hybrid cloud environment 300 including a private cloud network 314 and a public cloud network 320 upon which embodiments described herein may be implemented is shown. Private cloud network 314 includes a first physical computing system hosting a first set of multiple virtual machines (VMs) (e.g., guest VM 315*a* and guest VM 315*b*). Public cloud network 320 includes a second physical computing system hosting a second set of multiple virtual machines (VMs) (e.g., guest VM 325*a* and guest VM 325*b*).

In general, each of public cloud network 320 and private cloud network 314 are similar to (and can include more or fewer of the components described in the discussion of) VCE 214. As such, the details as described with respect to VCE 214 are not repeated for purposes of clarity. Sync 331 refers to the policy sync that occurs between the pluralities of VM's after private policy gateway appliance 301 and public policy gateway appliance 321 are put into action.

In one embodiment, private policy gateway appliance 301 is deployed in private cloud network 314. Similarly, public policy gateway appliance 321 is deployed in public cloud network 320. In one embodiment, the public policy gateway appliance 321 in public cloud network 320 is synchronized with private policy gateway appliance 301 deployed on private cloud network 314 (e.g., an enterprise VM).

In one embodiment, policies for the hybrid cloud environment 300 will be defined at the private cloud network 314. After the policies are defined for private cloud network 314, they are synchronized either in polling mode or based on some event mechanism with public policy gateway appliance 321 on public cloud network 320 and on any other public or private cloud networks that may be part of hybrid cloud environment 300.

Further, when a policy change occurs in private cloud network 314, the policy change is synchronized with public cloud network 320 and on any other public or private cloud networks that may be part of hybrid cloud environment 300.

For example, a policy could be defined that for all web VM's open port 80 and block all other ports. This policy will be transferred to public policy gateway appliance 321 which, in turn, will create a public cloud network 320 specific rule for enforcement purpose.

Once the policies are available in public cloud network 320 they can be enforced using various solutions such as, but not limited to, NSX-Everywhere. That is, as policies are synchronized across the hybrid cloud environment 300, a single pane of access is realized for policies deployed in private cloud network 314 and public cloud network 320. By providing a single pane of access to policies, policy enforcement in the hybrid cloud environment 300 is simplified. Moreover, since the policies are synchronized across hybrid cloud environment 300, there is no need to maintain and define multiple policies per cloud.

Moreover, once the policies are enforced, a single report can be generated using private policy gateway appliance 301 to generate a compliance report. This will enable single report generation of compliance of policies across public cloud network 320 and private cloud network 314 in hybrid cloud environment 300.

For example, in one manifestation for PCI compliant policy there is a policy that is linked to network and another aspect of policy that is linked to storage. The network policy will state that once a packet has been dropped by a firewall it will be analyzed by network and security team. Another aspect of PCI compliance state that a credit card transaction be available on near line storage for 7 days and on secondary storage for a period of 1 year. All financial transaction should be archived for a period of 7 years. In this case while policy definition is one there are multiple enforcement points.

As such, embodiments provide transparent enforcement of policies across any or all of the different clouds in hybrid cloud environment 300. Thus, one embodiment solves policy enforcement problems across public cloud network 320 and private cloud network 314 in hybrid cloud environment 300 by replicating the corporate policies by deploying public policy gateway appliance 321 in public cloud network 320. In addition, all the traffic in public cloud network 320 will be diverted through public policy gateway appliance 321 and/or private policy gateway appliance 301 for compliance. Further, public policy gateway appliance 321 on public cloud network 320 will be synced with private policy gateway appliance 301 on private cloud network 314 to ensure that only the latest policies are being enforced across hybrid cloud environment 300.

In one embodiment, the policy gateway appliances can be deployed in hybrid cloud environment 300 without affecting existing workloads. For example, if there are two VM's running on AWS as 10.10.10.1 10.10.10.2 then, in one embodiment, a new gateway can be deployed in between the two VM's which can do one-to-one IP translation so that an app facing IP does not change.

Figure 4:
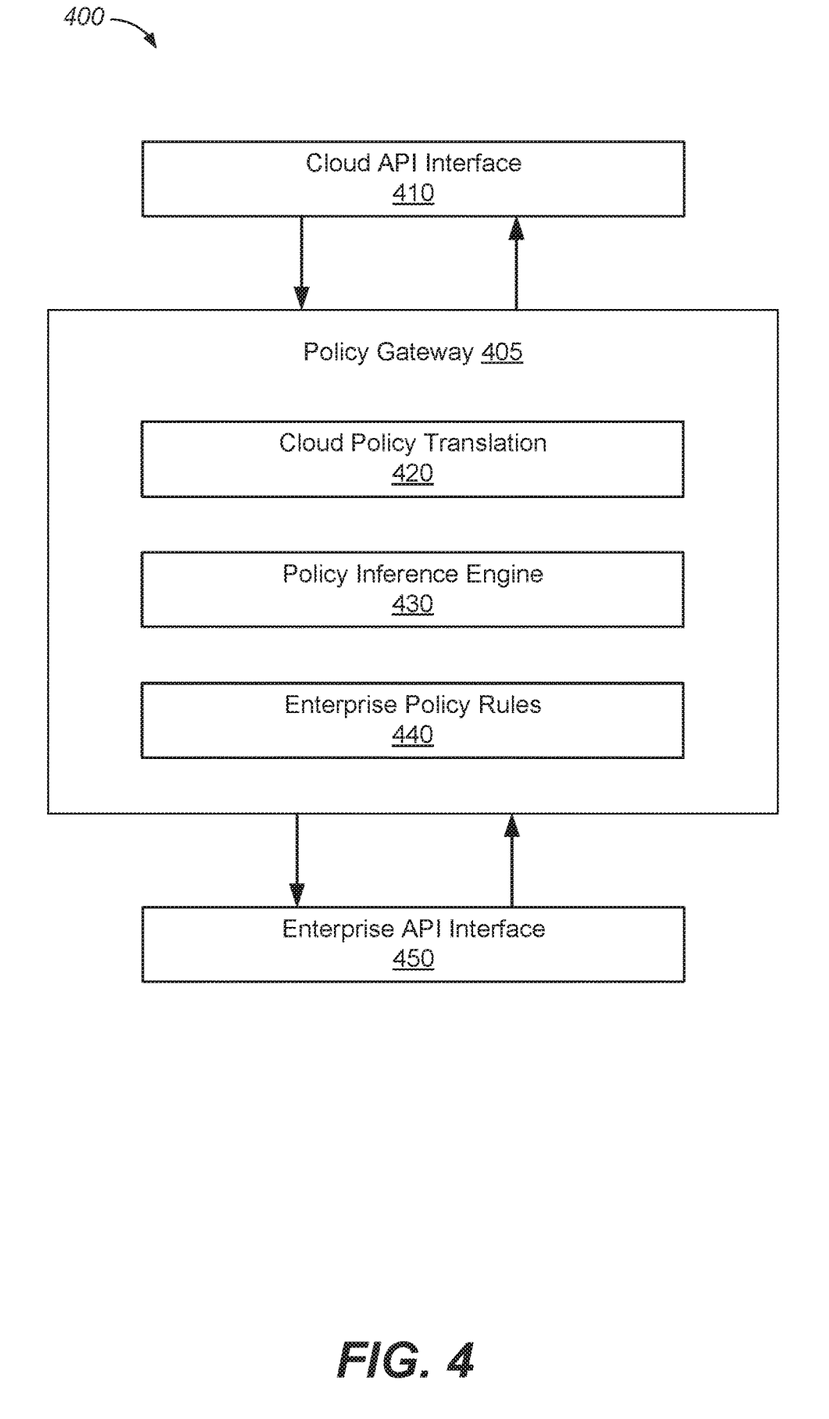
FIG. 4 illustrates a block diagram of policy gateway appliance for applying compliance policies on a private cloud network and a public cloud network upon which embodiments described herein may be implemented.

Referring now to FIG. 4, a block diagram 400 of policy gateway appliance 405 for applying compliance policies on private cloud network 314 and public cloud network 320 upon which embodiments described herein may be implemented.

In one embodiment, policy gateway appliance 405 is similar to either or both public policy gateway appliance 321 and private policy gateway appliance 301. In one embodiment, policy gateway appliance 405 connects to a corporate policy engine. In one embodiment, the policy gateway appliance 405 is connected using a standard interface, such as, but not limited to, REST. For example, the connection can be a public connection to public cloud network 320 via a cloud API interface 410. Similarly, the connection can be a private connection to private cloud network 314 via an enterprise API interface.

In one embodiment, policy gateway appliance 405 includes cloud policy translation 420, policy inference engine 430, and enterprise policy rules 440.

For example, enterprise policy rules 440 are the policy rules that are provided to the private cloud network 314. Cloud policy translation 420, e.g., an interpretation engine, is used to interpret the enterprise policy into a rule format that is understood by public cloud network 320. For example, cloud policy translation 420 would understand public cloud network 320 specific features in order to translate policies, such as security groups and the like.

In one embodiment, policy inference engine 430 provides support in cases where specific features like distributed firewall are not available on a specific cloud like AWS. In one embodiment, policy inference engine 430 includes architecture such as, but not limited to, VMware's cross cloud architecture to provide the support.

Figure 5:
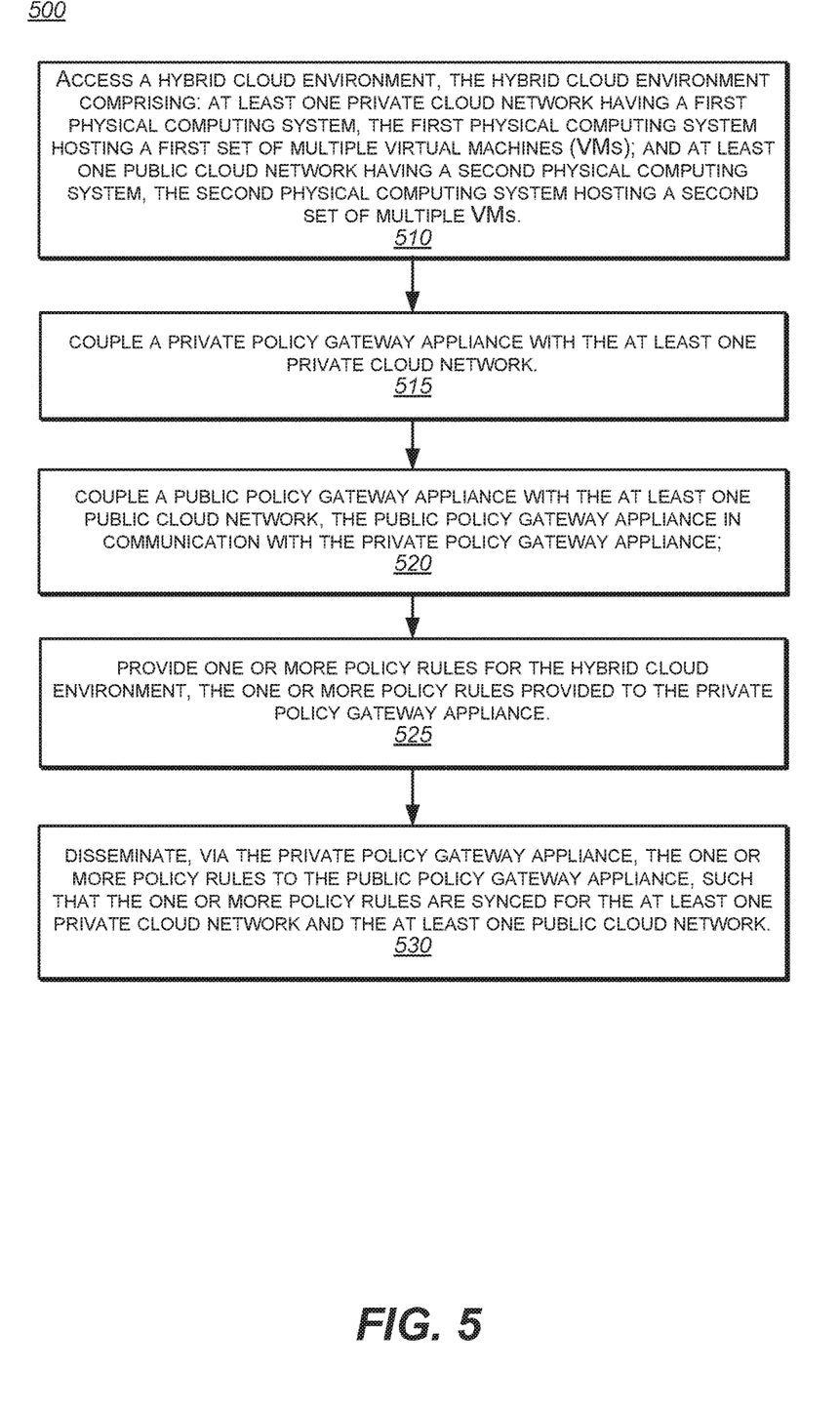
FIG. 5 illustrates a flow diagram of a method for outside-of-network management of a component in a virtual data center, according to various embodiments.

FIG. 5 illustrates a flow diagram 500 of a method for syncing compliance policies on a private cloud network 314 and a public cloud network 320, according to various embodiments. Procedures of the method will be described with reference to elements and/or components of FIGS. 1-4. It is appreciated that in some embodiments, the procedures may be performed in a different order than described, that some of the described procedures may not be performed, and/or that one or more additional procedures to those described may be performed. Flow diagram 500 includes some procedures that, in various embodiments, are carried out by one or more processors under the control of computer-readable and computer-executable instructions that are stored on non-transitory computer-readable storage media. It is further appreciated that one or more procedures described in flow diagram 500 may be implemented in hardware, software, or a combination of hardware with firmware and/or software.

With reference to 510 of flow diagram 500, one embodiment accesses a hybrid cloud environment 300, the hybrid cloud environment 300 including at least one private cloud network 314 having a first physical computing system, the first physical computing system hosting a first set of multiple virtual machines (VMs); and at least one public cloud network 320 having a second physical computing system, the second physical computing system hosting a second set of multiple VMs.

Referring now to 515 of flow diagram 500, one embodiment couples a private policy gateway appliance 301 with the at least one private cloud network 314.

With reference to 520 of flow diagram 500, one embodiment couples a public policy gateway appliance 321 with the at least one public cloud network 320, the public policy gateway appliance 321 in communication with the private policy gateway appliance 301.

Referring now to 525 of flow diagram 500, one embodiment provides one or more policy rules for the hybrid cloud environment 300, the one or more policy rules are provided to the private policy gateway appliance 301. In one embodiment, the one or more policy rules are stored at an enterprise policy rule library (such as enterprise policy rules 440) on policy gateway appliance 405.

With reference to 530 of flow diagram 500, one embodiment disseminates, via the private policy gateway appliance 301, the one or more policy rules to the public policy gateway appliance 321, such that the one or more policy rules are synced for the at least one private cloud network 314 and the at least one public cloud network 320.

In one embodiment, the synching of the one or more policy rules occurs when the private policy gateway appliance 301 or the public policy gateway appliance 321 enters a polling mode. For example, there may be a predetermined time period that, at the expiration thereof, causes one or both of the gateway appliances to check for a rules/policy update. If there is an update to the rules/policies, then the updated rules are disseminated and the predetermined time period begins to toll again. If there is not an update to the rules/policies, the there is no dissemination and the predetermined time period begins to toll again.

In one embodiment, the synching of the one or more policy rules occurs when a change is made to the one or more policy rules on the private policy gateway appliance 301. After the change is made, the private policy gateway appliance 301 will push the change to the public policy gateway appliance 321. In one embodiment, there may be both polling and pushing used to ensure the most up-to-date rules/policies are being enforced across the hybrid cloud environment 300.

In one embodiment, after the one or more policy rules are disseminated, they are translated from a private policy rules format used by the at least one private cloud network 314 into a public policy rules format used by the at least one public cloud network 320. In one embodiment, the translating is performed by cloud policy translation 420.

In another embodiment, prior to the one or more policy rules being disseminated, they are translated from the private policy rules format used by the at least one private cloud network 314 into the public policy rules format used by the at least one public cloud network 320.

One embodiment determines that one or more of the one or more policy rules are not applicable to a configuration of the at least one public cloud network 320 and modifies the configuration of the at least one public cloud network 320 such that the at least one public cloud network 320 will be able to operate under the one or more policy rules. In one embodiment, the modifying is performed by policy inference engine 430.

In one embodiment, an architecture within the private policy gateway appliance 301 is used to modify the configuration of the at least one public cloud network 320. For example, the architecture within the private policy gateway appliance 301 is a VMware cross cloud architecture.

By providing the hybrid cloud architecture as described herein, the private policy gateway appliance 301 can act as a single pane of access to the hybrid cloud environment 300. As such, a single report for one or more compliance policies across the hybrid cloud environment 300 can be generated via the single pane of access.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method for syncing compliance policies on a private cloud network and a public cloud network, the method comprising:

accessing a hybrid cloud environment, the hybrid cloud environment comprising:

at least one private cloud network having a first physical computing system, the first physical computing system hosting a first set of multiple virtual machines (VMs); and at least one public cloud network having a second physical computing system, the second physical computing system hosting a second set of multiple VMs;

coupling a private policy gateway appliance with the at least one private cloud network;

coupling a public policy gateway appliance with the at least one public cloud network, the public policy gateway appliance in communication with the private policy gateway appliance;

providing one or more policy rules for the hybrid cloud environment, the one or more policy rules provided to the private policy gateway appliance;

disseminating, via the private policy gateway appliance, the one or more policy rules to the public policy gateway appliance, such that the one or more policy rules are synced for the at least one private cloud network and the at least one public cloud network; and said one or more policy rules provided to the private policy gateway appliance and said one or more policy rules to the public policy gateway appliance synchronized either in polling mode or based on some event mechanism with said public policy gateway appliance on said at least one public cloud network and on said at least one private cloud networks that is part of said hybrid cloud environment.

2. The method of claim 1, further comprising:

translating the one or more policy rules from a private policy rules format used by the at least one private cloud network into a public policy rules format used by the at least one public cloud network.

3. The method of claim 1, further comprising:

determining that one or more of the one or more policy rules are not applicable to a configuration of the at least one public cloud network; and modifying the configuration of the at least one public cloud network such that said at least one public cloud network will be able to operate under the one or more policy rules.

4. The method of claim 3, further comprising:

utilizing an architecture within the private policy gateway appliance to modify the configuration of the at least one public cloud network.

5. The method of claim 4, wherein the architecture within the private policy gateway appliance is a VMware cross cloud architecture.

6. The method of claim 1, further comprising:

storing the one or more policy rules at an enterprise policy rule library on the private policy gateway appliance.

7. The method of claim 1, further comprising:
utilizing the private policy gateway appliance as a single pane of access to the hybrid cloud environment; and
generating, via the single pane of access, a single report for one or more compliance policies across the hybrid cloud environment.

8. The method of claim 1, further comprising:
syncing the one or more policy rules when the private policy gateway appliance or the public policy gateway appliance enters a polling mode.

9. The method of claim 1, further comprising:
syncing the one or more policy rules when a change is made to the one or more policy rules on the private policy gateway appliance,
the private policy gateway appliance pushing the change to the public policy gateway appliance.

10. A system for syncing compliance policies on a private cloud network and a public cloud network, the system comprising:
a hybrid cloud environment comprising:
at least one private cloud network having a first physical computing system, the first physical computing system hosting a first set of multiple virtual machines (VMs); and
at least one public cloud network having a second physical computing system, the second physical computing system hosting a second set of multiple VMs;
a private policy gateway appliance coupled with the at least one private cloud network;
a public policy gateway appliance coupled with the at least one public cloud network,
the public policy gateway appliance in communication with the private policy gateway appliance; and
one or more policy rules for the hybrid cloud environment,
the one or more policy rules provided to the private policy gateway appliance,
the private policy gateway appliance to disseminate the one or more policy rules to the public policy gateway appliance, such that the one or more policy rules are synced for the at least one private cloud network and the at least one public cloud network; and
said one or more policy rules provided to the private policy gateway appliance and said one or more policy rules to the public policy gateway appliance synchronized either in polling mode or based on some event mechanism with said public policy gateway appliance on said at least one public cloud network and on said at least one private cloud networks that is part of said hybrid cloud environment.

11. The system of claim 10, wherein the private policy gateway appliance further comprises:
a cloud policy translator to translate the one or more policy rules from a private policy rules format used by the at least one private cloud network into a public policy rules format used by the at least one public cloud network.

12. The system of claim 10, wherein the private policy gateway appliance further comprises:
a policy inference engine configured to:
determine one or more of the one or more policy rules that are not applicable to a configuration of the at least one public cloud network; and
modify the configuration of the at least one public cloud network such that said at least one public cloud network will be able to operate under the one or more policy rules.

13. The system of claim 12, wherein the modification of the configuration of the at least one public cloud network is provided by an architecture within the policy inference engine.

14. The system of claim 13, wherein the architecture within the policy inference engine is a VMware cross cloud architecture.

15. The system of claim 10, wherein the private policy gateway appliance further comprises:
an enterprise policy rule library to store the one or more policy rules at the private policy gateway appliance.

16. The system of claim 10, wherein the dissemination of the one or more policy rules from the private policy gateway appliance to the public policy gateway appliance provides a single pane of access to the hybrid cloud environment,
the single pane of access providing a single point report generation of one or more compliance policies across the hybrid cloud environment.

17. The system of claim 10, wherein the one or more policy rules are synced when the private policy gateway appliance or the public policy gateway appliance enters a polling mode.

18. The system of claim 10, wherein the one or more policy rules are synced when a change is made to the one or more policy rules on the private policy gateway appliance and the private policy gateway appliance pushes the change to the public policy gateway appliance.

19. A non-transitory processor readable storage medium having computer readable program code stored thereon for causing a computing system to perform a method comprising:
accessing a hybrid cloud environment, the hybrid cloud environment comprising:
at least one private cloud network having a first physical computing system, the first physical computing system hosting a first set of multiple virtual machines (VMs); and
at least one public cloud network having a second physical computing system, the second physical computing system hosting a second set of multiple VMs;
coupling a private policy gateway appliance with the at least one private cloud network;
coupling a public policy gateway appliance with the at least one public cloud network,
the public policy gateway appliance in communication with the private policy gateway appliance;
providing one or more policy rules for the hybrid cloud environment,
the one or more policy rules provided to the private policy gateway appliance;
disseminating, via the private policy gateway appliance, the one or more policy rules to the public policy gateway appliance, such that the one or more policy rules are synced for the at least one private cloud network and the at least one public cloud network; and
said one or more policy rules provided to the private policy gateway appliance and said one or more policy rules to the public policy gateway appliance synchronized either in polling mode or based on some event mechanism with said public policy gateway appliance on said at least one public cloud network and on said at least one private cloud networks that is part of said hybrid cloud environment.

20. The non-transitory processor readable storage medium of claim 19, further comprising:
translating the one or more policy rules from a private policy rules format used by the at least one private cloud network into a public policy rules format used by the at least one public cloud network;

determining that one or more of the one or more policy rules are not applicable to a configuration of the at least one public cloud network; and modifying the configuration of the at least one public cloud network such that said at least one public cloud network will be able to operate under the one or more policy rules.

* * * * *